(12) United States Patent
DiCintio et al.

(10) Patent No.: US 9,127,552 B2
(45) Date of Patent: *Sep. 8, 2015

(54) TRANSITION PIECE AFT FRAME WITH FUEL INJECTION APERTURES

(75) Inventors: Richard Martin DiCintio, Simpsonville, SC (US); Patrick Benedict Melton, Horse Shoe, NC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 913 days.

This patent is subject to a terminal disclaimer.

(21) Appl. No.: 13/290,769

(22) Filed: Nov. 7, 2011

(65) Prior Publication Data

US 2013/0111910 A1    May 9, 2013

(51) Int. Cl.
| F01D 9/02 | (2006.01) |
| F01D 25/24 | (2006.01) |
| F02K 3/08 | (2006.01) |
| F02C 3/30 | (2006.01) |
| F02K 3/10 | (2006.01) |

(52) U.S. Cl.
CPC ............... *F01D 9/023* (2013.01); *F01D 25/24* (2013.01); *F02C 3/30* (2013.01); *F02K 3/08* (2013.01); *F02K 3/10* (2013.01)

(58) Field of Classification Search
CPC ............ F02K 3/08; F02K 3/10; F01D 9/023; F01D 25/24; F02C 7/22; F02C 2/222; F23R 3/28; F23R 3/34; F23R 3/36; F23R 3/46; F23R 3/446; F23R 3/50
See application file for complete search history.

(56) References Cited

U.S. PATENT DOCUMENTS

| 5,197,278 | A | * | 3/1993 | Sabla et al. | 60/773 |
| 6,047,550 | A | | 4/2000 | Beebe | |
| 6,619,026 | B2 | | 9/2003 | Carelli et al. | |
| 7,568,343 | B2 | * | 8/2009 | Harris et al. | 60/732 |
| 7,665,309 | B2 | * | 2/2010 | Parker et al. | 60/776 |
| 8,745,986 | B2 | * | 6/2014 | Melton et al. | 60/735 |
| 2009/0084082 | A1 | | 4/2009 | Martin et al. | |
| 2010/0170252 | A1 | | 7/2010 | Venkataraman et al. | |
| 2011/0179803 | A1 | | 7/2011 | Berry et al. | |

FOREIGN PATENT DOCUMENTS

| EP | 2500523 A2 | 9/2012 |
| WO | 2009078891 A2 | 6/2009 |

OTHER PUBLICATIONS

Search Report from EP Application No. 12190991.5 dated Nov. 22, 2013.

* cited by examiner

*Primary Examiner* — Phutthiwat Wongwian
*Assistant Examiner* — Arun Goyal

(57) ABSTRACT

A transition piece aft frame is provided and includes a manifold having an interior that is receptive of fuel and formed to define fuel injection holes configured to inject the received fuel from the manifold interior toward a main flow of products of combustion flowing through the manifold. The manifold includes a main body having an interior facing surface that faces the main flow of the products of the combustion and along which the fuel injection holes are defined.

14 Claims, 3 Drawing Sheets

TRANSITION PIECE AFT FRAME WITH FUEL INJECTION APERTURES

BACKGROUND OF THE INVENTION

The subject matter disclosed herein relates to a transition piece aft frame and, more particularly, to a transition piece aft frame of a turbomachine to provide circumferential direct fuel injection with relatively low residence time.

A turbomachine, such as a gas engine turbine, generally includes a compressor to compress inlet gases, a combustor, which is fluidly coupled to and disposed downstream from the compressor section, and a turbine. The combustor has an interior in which the compressed gases are combusted along with fuel and includes a transition piece, which is formed to define an interior through which a main flow of products of the combustion flow toward the turbine. The turbine is fluidly coupled to the combustor downstream from the transition piece and thereby configured to be receptive of the main flow from the interior of the transition piece. As the main flow proceeds through the turbine, the energy of the main flow is converted into mechanical energy that is used to generate power and/or electricity. The main flow is eventually exhausted from the turbine and partially emitted into the atmosphere.

Due to the combustion of the compressed gases and the fuel, some of the emissions include pollutants, such as oxides of nitrogen (NOx). Recently, efforts have been undertaken to reduce the emissions of those pollutants. For example, late lean injection (LLI) of fuel into the combustor and/or the transition piece has been shown to provide for reductions in the emissions of NOx.

BRIEF DESCRIPTION OF THE INVENTION

According to one aspect of the invention, a transition piece aft frame is provided and includes a manifold having an interior that is receptive of fuel and formed to define fuel injection holes configured to inject the received fuel from the manifold interior toward a main flow of products of combustion flowing through the manifold. The manifold includes a main body having an interior facing surface that faces the main flow of the products of the combustion and along which the fuel injection holes are defined.

According to another aspect of the invention, a turbomachine is provided and includes a combustor section having a combustion zone in which combustion occurs and including a transition piece body defining an interior through which a main flow of products of combustion flow, a turbine section into which the main flow flows from the interior of the transition piece body and a transition piece aft frame interposed between an aft end of the transition piece body and the turbine section and configured to inject fuel toward the main flow.

According to yet another aspect of the invention, a turbomachine is provided and includes a combustor section having a combustion zone in which combustion occurs, the combustor section including a transition piece having a body defining an interior through which products of combustion flow as a main flow, a turbine section into which the main flow flows from the interior of the transition piece body and a transition piece aft frame interposed between the transition piece body and the turbine section, the transition piece aft frame including a manifold having an interior that is receptive of fuel. The manifold is formed to define fuel injection holes configured to inject the fuel from the manifold interior toward the main flow.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
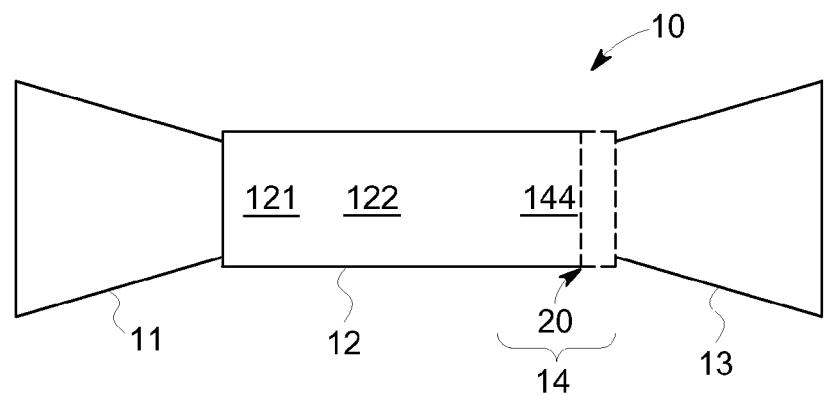
FIG. 1 is a schematic view of a turbomachine.

With reference to FIG. 1, a turbomachine 10, such as a gas engine turbine, is provided. The turbomachine 10 includes a compressor section 11 to compress inlet gases, a combustor section 12, which is fluidly coupled to and disposed downstream from the compressor section 11, and a turbine section 13. The combustor section 12 has a premixing zone 121 in which the gases compressed by the compressor section 11 are mixed with fuel to form a fuel/air mixture and a combustion zone 122 in which the fuel/air mixture is combusted. The combustor section 12 also includes a transition piece body 14, which is formed to define an interior 144 through which a main flow of products of the combustion flow toward the turbine section 13. The turbine section 13 is fluidly coupled to the combustor section 12 at a location whereby the turbine section 13 is disposed downstream from the transition piece body 14. The turbine section 13 is thereby configured to be receptive of the main flow from the interior 144 of the transition piece body 14.

The turbomachine 10 further includes a transition piece aft frame 20, which may be formed by casting processes or otherwise machined. The transition piece aft frame 20 is disposed at an aft end of the transition piece body 14 and is fluidly interposed between more upstream portions of the transition piece body 14 and the turbine section 13. In accordance with embodiments, the transition piece aft frame 20 is configured to inject fuel toward the main flow such that the injected fuel has a residence time within the combustor section 12 of around 1-3 milliseconds or 2 milliseconds or less. The fuel is supplied to the transition piece aft frame 20 by separate fuel circuits and manifolds in accordance with known structures and configurations.

Figure 2:
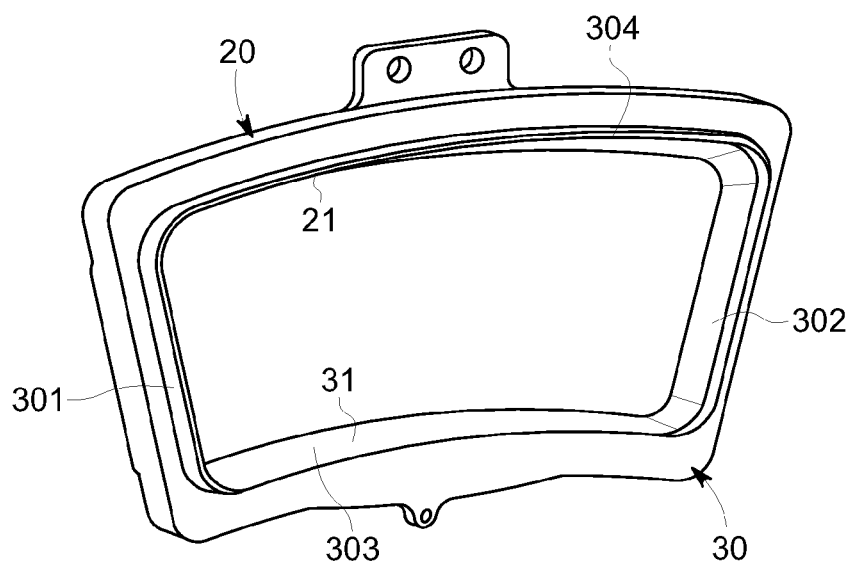
FIG. 2 is a perspective view of a transition piece aft frame.
Figure 3:
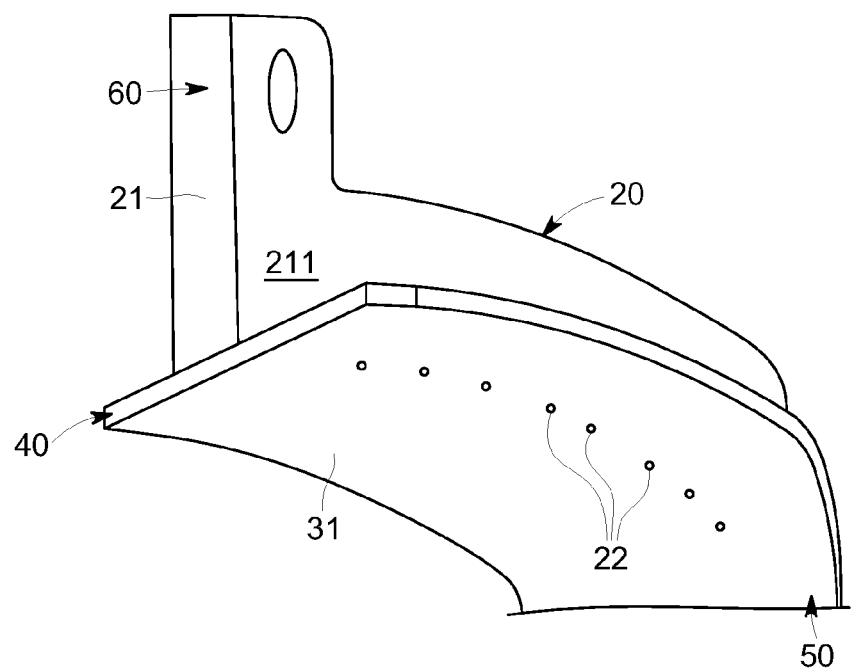
FIG. 3 is an enlarged perspective view of a portion of the transition piece aft frame of FIG. 2.

With reference to FIGS. 2 and 3, the transition piece aft frame 20 includes a manifold 21 having a manifold interior 211. The manifold interior 211 is receptive of the fuel that is to be injected toward the main flow through the combustor section 12. The manifold 21 is formed to define fuel injection holes 22 that are configured to inject the fuel from the manifold interior 211 toward the main flow. The manifold 21 includes a generally four sided main body 30 having an interior facing surface 31 extending along all four sides that faces the main flow. The fuel injection holes 22 are defined along the interior facing surface at least at one or more of the four sides.

In accordance with embodiments, the turbomachine 10 is provided with a can-annular configuration. In such a case the main body 30 may have, for example, a curvilinearly trapezoidal shape, as shown in FIG. 2 (or FIG. 4). This exemplary curvilinearly trapezoidal shape is characterized in that the sidewalls 301, 302 oppose one another and are substantially straight. The inner and outer radial walls 303, 304 extend between the sidewalls 301, 302 and similarly oppose one another. The inner and outer radial walls 303, 304 exhibit curvatures corresponding to the overall radial curvature of the can-annular configuration.

The transition piece aft frame 20 further includes at least one of a forwardly extending flange 40 and aft extending flange 50, which extend in opposite axial directions from the main body 30, and support struts 60. The forwardly extending flange 40 is configured for fluid coupling of the main body 30 with the more upstream portions of the transition piece body 14. Similarly, the aft extending flange 50 is configured for fluid coupling of the main body 30 with the turbine section 13. With the main body 30 fluidly coupled to the more upstream portions of the transition piece body 14 and the turbine section 13, the main flow of the products of the combustion can flow smoothly from the combustor section 12 to the turbine section 13. The support struts 60 are each coupled to the main body 30 and are configured to supportively position the transition piece aft frame 20 relative to the transition piece body 14 and the turbine section 13.

Figure 4:
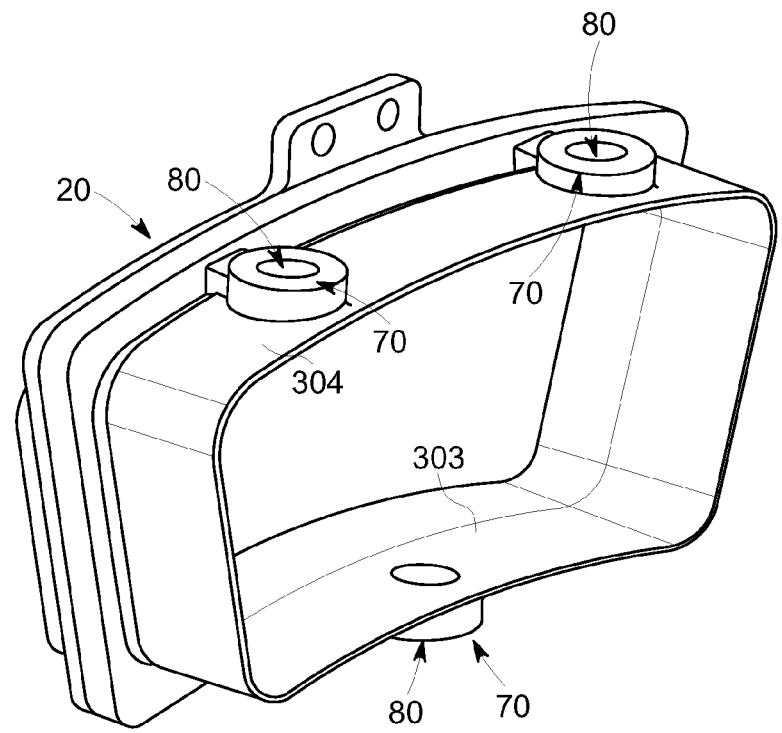
FIG. 4 is a perspective view of a transition piece aft frame in accordance with further embodiments.
Figure 5:
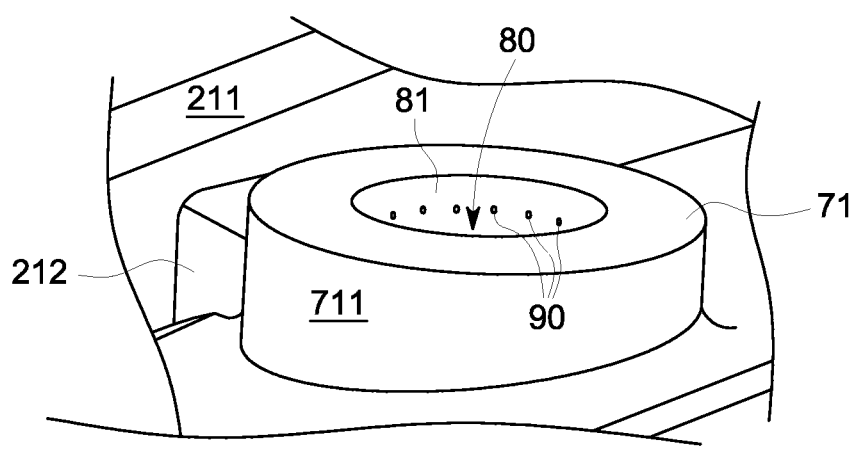
FIG. 5 is an enlarged perspective view of a portion of the transition piece aft frame of FIG. 4.

With reference to FIGS. 4 and 5, the transition piece aft frame 20 may include at least one or more injector heads 70. Each injector head 70 may include an additional manifold 71 having an additional manifold interior 711, which is fluidly coupled to the manifold interior 211 by way of connectors 212 such that each additional manifold 71 may be provided with fuel from the manifold interior 211. The additional manifold 71 of each injector head 70 is formed to define an air injection hole 80 with an interior facing surface 81 and head fuel injection holes 90. The air injection hole 80 is configured such that, for example, compressor discharge (CDC) air may be communicated to the main flow from an exterior of the transition piece body 14. The head fuel injection holes 90 are defined in an array around the interior facing surface 81 of the air injection hole 80 and are configured to inject the fuel into the head fuel injection holes 90 from the additional manifold interior 711.

As the exemplary CDC air flows through the air injection hole 80, the air flow entrains a flow of the fuel from the additional manifold interior 711 through the head fuel injection holes 90 and may increase an efficiency of the fuel injection through the head fuel injection holes 90.

As shown in FIGS. 4 and 5 and, in accordance with embodiments, two injector heads 70 may be provided at the outer radial wall 304 of the main body 30 and one injector head 70 may be provided at the inner radial wall 303 of the main body 30. It is to be understood, however, that this configuration is merely exemplary and that more or less injector heads 70 may be provided. In addition, the injector heads 70 may be provided on the aft extending flange 50 or the forwardly extending flange 40.

In accordance with the embodiments described herein, the fuel injected into the main flow may include a type of fuel chosen for axially staged fuel injection systems and/or late lean injection (LLI) systems. Such LLI systems have been shown to provide benefits in terms of reductions in emissions of oxides of nitrogen (NOx) when LLI fuel has a given residence time in a combustion system (i.e., 5 milliseconds of residence time). Where the fuel is injected into the main flow by the transition piece aft frame 20, as described herein, the residence time of the fuel may be decreased to about the 1 to 3 millisecond range.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A transition piece aft frame interposed between an aft end of a transition piece body and a turbine section, comprising:
    a manifold having an interior that is receptive of fuel and comprising fuel injection holes configured to inject the fuel from the interior toward a main flow of products of combustion flowing through the manifold,
    the manifold comprising a main body having an interior facing surface that faces the main flow of the products of the combustion and along which the fuel injection holes are defined,
    the interior facing surface of the main body having a curvilinearly trapezoidal shape in a plane defined transversely with respect to a predominant direction of the main flow.

2. The transition piece aft frame according to claim 1, further comprising forward and aft flanges extending in opposite axial directions from the main body.

3. The transition piece aft frame according to claim 1, wherein the manifold comprises an injector head fluidly coupled to the manifold interior and formed to define:
    an air injection hole, and
    head fuel injection holes arrayed around an interior facing surface of the air injection hole.

4. The transition piece aft frame according to claim 1, further comprising support struts coupled to the main body to supportively position the transition piece aft frame.

5. A turbomachine, comprising:
    a combustor section having a combustion zone in which combustion occurs and including a transition piece body defining an interior through which a main flow of products of combustion flow;
    a turbine section into which the main flow flows from the interior of the transition piece body; and
    a transition piece aft frame interposed between an aft end of the transition piece body and the turbine section and configured to inject fuel toward the main flow,
    wherein the transition piece aft frame comprises a manifold defining an interior that is receptive of fuel,
    the manifold comprising:
    fuel injection holes configured to inject the fuel toward the main flow; and
    a main body having an interior facing surface that faces the main flow and has a curvilinearly trapezoidal shape in a plane defined transversely with respect to a predominant direction of the main flow.

6. The turbomachine according to claim 5, wherein the fuel injection holes are defined along the interior facing surface.

7. The turbomachine according to claim 5, wherein the transition piece aft frame further includes forward and aft flanges extending in opposite axial directions from the main body, the forward and aft flanges being configured for fluid coupling of the main body with the transition piece body and the turbine section, respectively.

8. The turbomachine according to claim 5, wherein the manifold comprises an injector head fluidly coupled to the manifold interior and formed to define:
   an air injection hole, and
   head fuel injection holes arrayed around an interior facing surface of the air injection hole.

9. The turbomachine according to claim 5, wherein the transition piece aft frame further comprises support struts coupled to the main body to supportively position the transition piece aft frame relative to the transition piece body and the turbine section.

10. A turbomachine, comprising:
   a combustor section having a combustion zone in which combustion occurs, the combustor section including a transition piece having a body defining an interior through which products of combustion flow as a main flow;
   a turbine section into which the main flow flows from the interior of the transition piece body; and
   a transition piece aft frame interposed between the transition piece body and the turbine section, the transition piece aft frame including a manifold having an interior that is receptive of fuel, the manifold comprising:
      fuel injection holes configured to inject the fuel from the manifold interior toward the main flow; and
      a main body having an interior facing surface that faces the main flow and has a curvilinearly trapezoidal shape in a plane defined transversely with respect to a predominant direction of the main flow.

11. The turbomachine according to claim 10, wherein the injection holes are defined along the interior facing surface.

12. The turbomachine according to claim 10, wherein the transition piece aft frame further includes forward and aft flanges extending in opposite axial directions from the main body, the forward and aft flanges being configured for fluid coupling of the main body with the transition piece body and the turbine section, respectively.

13. The turbomachine according to claim 10, wherein the manifold comprises an injector head fluidly coupled to the manifold interior and formed to define:
   an air injection hole, and
   head fuel injection holes arrayed around an interior facing surface of the air injection hole.

14. The turbomachine according to claim 10, wherein the transition piece aft frame further comprises support struts coupled to the main body to supportively position the transition piece aft frame relative to the transition piece body and the turbine section.

* * * * *